Sept. 22, 1959      E. L. MOYER      2,905,279

ROTOR CONSTRUCTIONS FOR DISK BRAKES AND THE LIKE

Filed Nov. 19, 1956      2 Sheets-Sheet 1

INVENTOR.
EDWARD L. MOYER
BY John A. Young
ATTORNEY

United States Patent Office 2,905,279
Patented Sept. 22, 1959

2,905,279

ROTOR CONSTRUCTIONS FOR DISK BRAKES AND THE LIKE

Edward L. Moyer, South Bend, Ind., assignor to Bendix Aviation Corporation, South Bend, Ind., a corporation of Delaware Application November 19, 1956, Serial No. 622,944

8 Claims. (Cl. 188—218)

This invention relates to rotor constructions for disk brakes and the like and is described herein in conjunction with an aircraft wheel and brake. The rotor construction may also be used in clutch mechanisms, in automobile brakes and numerous other applications which will suggest themselves to those skilled in the art.

During a brake application, the kinetic energy of the vehicle is transformed into heat energy by the frictional inter-engagement of the rotatable and relatively non-rotatable members of the brake. The heat which is so developed, produces a deleterious increase in temperature of the components of the brake which are sometimes caused to distort and become generally misshapen under the influence of this developed heat. Distortion of the brake parts is very undesirable since the brake will not thereafter function properly, and even minor distortions of the brake parts, can affect the rate of wear of the lining and also influence brake clearance such that "brake drag" occurs. A "dragging brake" results in excessive over-heating of the brake and rapid wear of the brake lining. All of these considerations tend to increase service expense and unduly shorten the usable life of the brake.

Many proposals have been made in compensating for thermal and mechanical distortion of the brake parts, particularly the brake rotor. One example of how to provide for expansion of the rotor portion of the brake is shown in Du Bois Patent No. 2,423,881, issued July 15, 1947. In this patent, there is shown a rotor construction in which the segments of the rotor are made up in arcuate sectors which are then linked together in a manner permitting both circumferential and radial expansion of the respective sectors, thus, there is avoided buckling or dishing of the rotor or other forms of distortion under the influence of the high temperatures which are reached during braking.

I propose in the present invention to replace this segmented rotor construction with a solid type rotor construction and provide for expansion of the rotor by uniquely constructed expansion slots which accomplish substantially the same ends, i.e., radial and circumferential expansion of the rotor in a manner preventing objectionable distortion. The solid rotor has some advantages over the segmented rotor construction in that it is a one piece member and can therefore be made somewhat more cheaply than the segmented rotor construction. Also, the solidly constructed rotor is not quite as prone to mechanical failure under the influence of forces which are imposed on the rotor as it is accelerated and rotated by the aircraft wheel. Although the solid rotor is not quite as efficient as the segmented rotor in its resistance to distortion, it is sufficiently improved so that the previously mentioned advantages make it desirable from an over-all viewpoint.

Other objects and features of the invention will become apparent from a description of the following embodiments which proceed with reference to the accompanying drawings, wherein.

Figure 1:
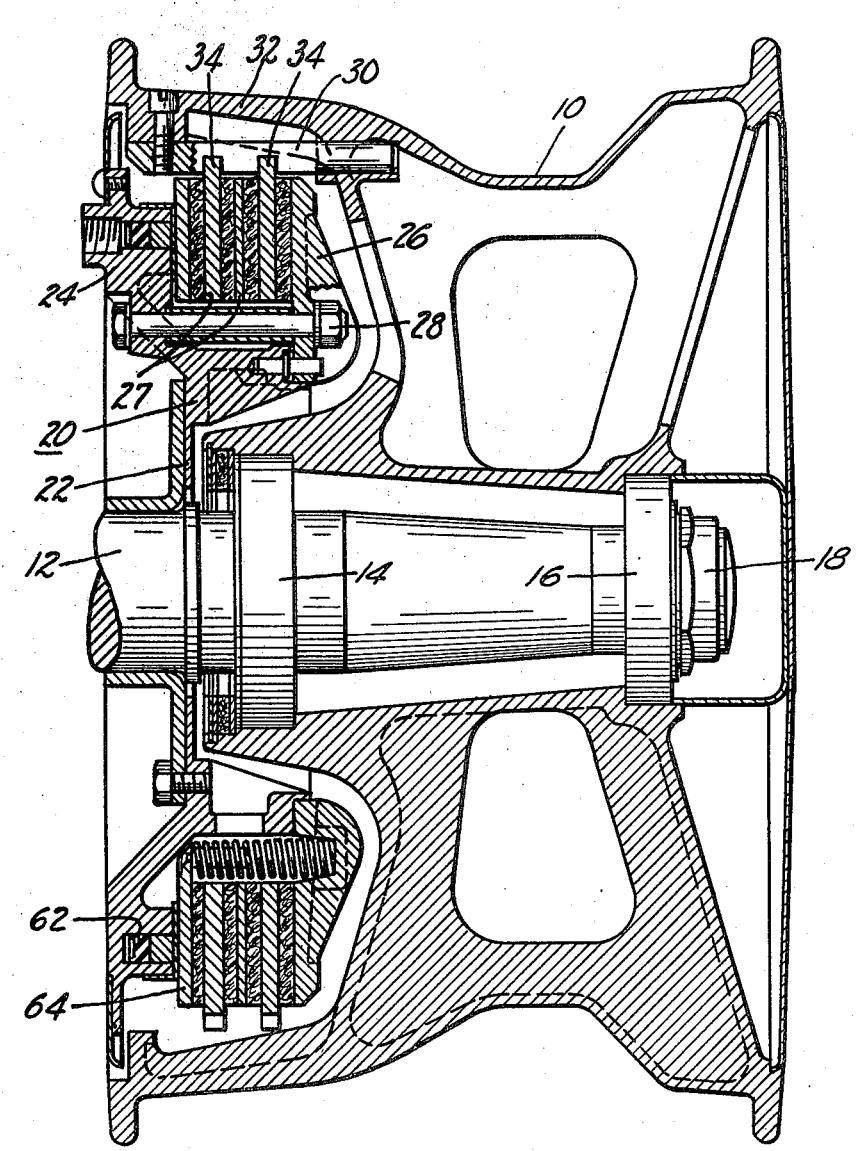
Figure 1 is a vertical section taken through a wheel, axle and brake assembly having a brake of a type incorporating my invention.

Referring to the drawings, wheel 10 is supported on a fixed axle 12 through bearings 14 and 16 and retained thereon by a hub nut 18.

Brake carrier 20 is mounted on axle flange 22 and includes a fluid motor housing 24 at one side and a reaction plate 26 at the other side. Friction material lined stators 27 are keyed for axial movement on stator keys 28 which are fixed to the housing 24 and reaction plate 26 respectively.

A number of rotor drive keys 30 are fastened to the rim 32 of the wheel and, splined thereto for axial movement, are a number of rotors 34 which are interleaved with stators 27.

Figure 2:
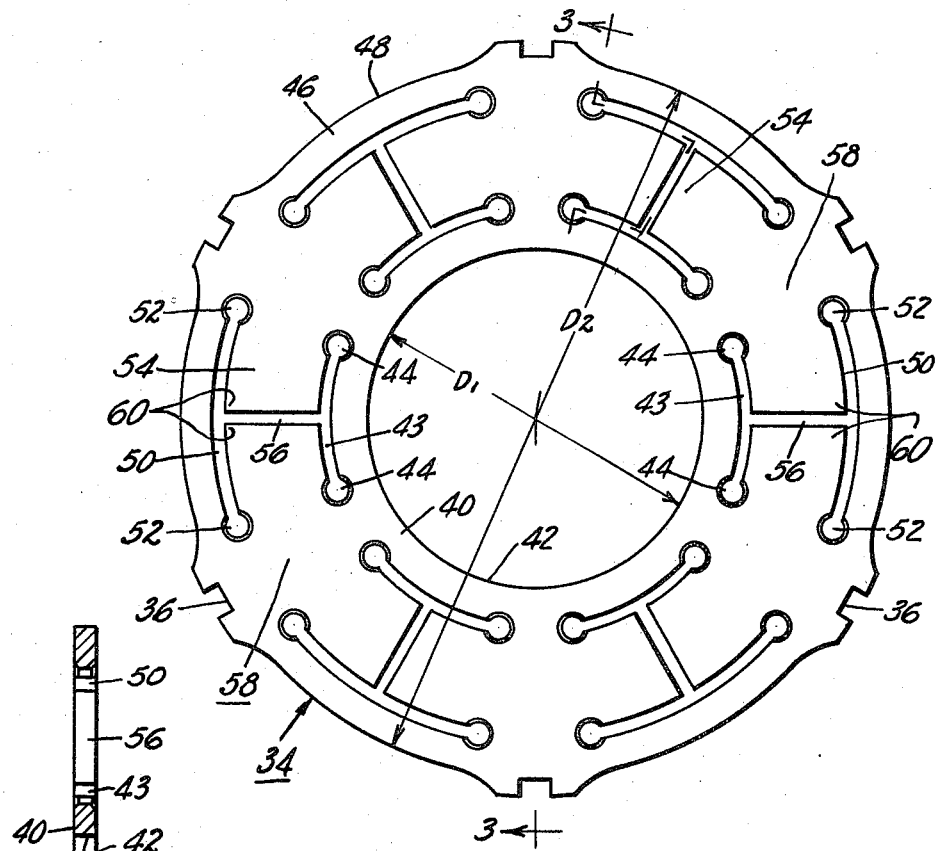
Figure 2 is a side elevation of the rotor which is shown detached from the brake; and, Figure 3 is a section view taken on the sectional line 3—3 of Figure 2.
Figure 3:
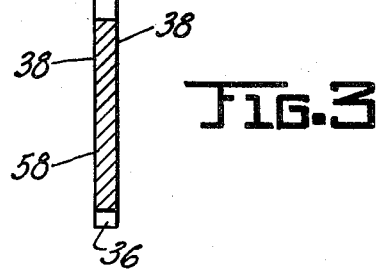

Referring next to Figures 2 and 3, the details of construction of the rotor 34 will next be considered. Each rotor 34 is identically constructed so that only one of them will be considered. The rotor 34 has a number of circumferentially spaced slots 36 which are keyed with drive keys 30 as described. The rotor is ring-shaped, having an inner diameter D–1 and an outer diameter D–2 and the differential annular area provides braking surfaces 38 on each side of the rotor.

The rotor 34 is divided into three different segments: a radially innermost annular segment 40, which is bounded at one side by the inner periphery of opening 42, and at the opposite side by a plurality of arcuate, spaced apart circumferential slots 43 which terminate in rounded openings 44; a radially outermost annular segment 46 which is bounded by the outer periphery 48 and a second series of arcuate, spaced apart circumferential slots 50 which are formed concentrically with the first series of slots 43 and which also terminate in rounded openings 52; radially intermediate segments 54 which are separated from contigous segments by radial slots 56 intersecting the arcuate concentric slots 43 and 50; and, sectors 58 of segments 54 which join the inner and outer segments 40 and 46.

It will be noted that the slots 43, 50 and 56 form a pattern which resembles the letter H with the two legs 43 and 50 being curved and of unequal length so that the ends lie on the same radius. It is not essential to the invention however that the ends do lie on the same radius. It will be further noted that the slots 56 are formed perpendicularly to slots 43 and 50, but it is possible to form the slots 56 acutely or obtusely to the slots 43 and 50. A number of these slot patterns are formed around the circumference of the rotor to provide for expansion of the various segments of the rotor under the influence of heat, without distorting the opposite friction element engaging surfaces 38 from the condition shown in Figure 3.

Where the slots 56 intersect slots 43 and 50 there are formed sharp corners 60 which may be chamfered so that if the friction surfaces 38 should distort slightly then these areas of the rotor will have less tendency to score or unduly abrade the engaging friction material lining.

The significance of the location and construction of the expansion slots 43, 50 and 56 will next be discussed. When subjected to heat, the annular segment 40 of the rotor tends to expand in a radially outward direction, and so also does the annular segment 46 but because of the larger radius of segment 46, there is a greater proportional expansion of segment 46 which tends to warp the rotor out of its planar shape indicated in Figure 4, and into a frusto-conical shape. If this should occur then the friction element engaging surfaces 38 are no longer flat engageable surfaces. This change is brought about as a result of change in radius of curvature of the various portions of the rotor. With this dished condition of the rotor, the clearance between the rotors and stators is not maintained uniformly and this results in non-uniform wear of the friction lining. Also, it is not uncommon to warp the solid rotor surfaces into contact with the lining to cause a dragging brake condition.

With the present invention, the expansion slots 43 and 50 permit relative radial movement between the segments 40, 46 and 54 so that notwithstanding their different radial lengths, which produce differences in expansion under the influence of heat, the clearances of the slots 43 and 50 will change rather than producing a buckling or warping of the flat engageable surfaces 38.

Another factor causing distortion of the rotor surface is the tendency for the segment 54 to expand circumferentially under the influence of the braking heat. This tendency for expansion of segments 54 is compensated for by slots 56 which permit circumferential expansion of segment 54 without buckling the rotor 34. The net result of circumferential expansion of segment 54 is to decrease the size of expansion slots 56 without buckling the flat attitude of friction surfaces 38. Sectors 58 of segments 54 serve to interconnect the three segments 40, 46 and 54 so that the rotor as a whole is a one piece construction.

It will be noted that the outer periphery 48 of the rotor in the region of the slots 36 is increased slightly in size to provide added strength where it is driven by the rotor keys. It should be further noted that the driving slots 36 are in radial alignment with sectors 58 to provide maximum strength for the rotor.

The ends of the slots 43 and 50 are rounded as indicated at 44 and 52 to eliminate stress concentrations which might tend to crack the rotor.

In operation, the rotors 34 which engage keys 30 are driven by rotation of the wheel 10. When the piston 62 is forced toward the right by fluid pressure, the adjacent pressure plate 64, which engages keys 28, is also forced toward the right to clamp the interleaved rotors and stators together in frictional engagement. The stack of rotors and stators is fixed axially by reaction plate 26. It has been found, from numerous experiments, that even though braking heats as high as 1800° F. are developed in the brake, a solid rotor construction such as the one shown in Figures 3 and 4 is prevented from warping unduly because of the construction and arrangement of the expansion slots.

One of the beneficial results of maintaining the rotor in its original condition is the reduction in rate of lining wear and simplification of maintenance problems. The likelihood of dragging brakes and overheating the brakes is also reduced to a minimum.

Although one example of the embodiment has been chosen to illustrate the invention, it will be understood that this is only exemplary of the principles of the invention and is not to be interpreted as restricted thereof. Numerous modifications and revisions of the invention will occur to those skilled in the art, and it is to be reasonably expected that such revisions and variations of the invention as incorporate the herein disclosed principles, will be included within the scope of the following claims.

I claim:

1. A brake rotor having an engageable friction surface formed by each side thereof, said rotor comprising a radially inner annular segment bounded by arcuate slots terminating in rounded end portions, a radially outward annular segment also bounded by arcuate slots terminating in rounded end portions, radially extending portions joining said inner and outer annular segments, an intermediate annular segment bounded by said arcuate slots, and a plurality of radial slots extending between the arcuate slots and dividing the intermediate annular segments into several portions, said inner, outer, and intermediate segments lying in a common plane under all conditions of operation.

2. A brake rotor of solid cross section comprising a first ring portion bounded by an inner periphery and a series of spaced apart arcuate slots whose arcs are formed concentrically with said inner ring and a second ring portion bounded by the outer periphery of the rotor and a second series of arcuate slots with arcs of greater radius than said first series but concentric therewith, a radially intermediate segment joining said first and second ring portions and having a plurality of radial slots permitting relative circumferential expansion of said intermediate segment said first and second ring portions together with said intermediate segment defining two oppositely disposed flat friction surfaces.

3. A ring shaped rotor having an engageable friction surface formed by each side thereof, said rotor comprising three concentric annular segments which are arranged in a common plane and which are constructed to permit radial expansion therebetween, the radially innermost segment being an annulus bounded by the inner periphery at one side and a first series of spaced apart arcuate slots at the other side, the radially outermost segment being bounded at one side by the outer periphery of the rotor and at the other side by a second series of spaced apart arcuate slots which are formed concentrically with said first series of slots, and an intermediate annular segment which is formed into sectors by radial slots which connect the inner and outer series of arcuate slots to permit circumferential expansion between the sectors of the intermediate annular segment, said arcuate slots being discontinuous to provide sectors of said intermediate annular segment which bind together the innermost and outermost annular segments.

4. In a disk brake, a ring shaped rotor of solid cross section having an integral friction surface formed on each side thereof, said rotor comprising a plurality of arcuate sectors each having a radially inner arcuate slot and a radially outer arcuate slot formed concentrically with said first slot, a transverse slot intersecting said inner and outer slots and formed approximately perpendicularly thereto approximately midway between the ends thereof, said slots being thereby formed as a plurality of spaced apart H shaped constructions permitting radial expansion between the innermost and outermost segments of the rotor and circumferential expansion of the intermediate portion of said rotor, said slots and said plurality of arcuate sectors lying in a common plane under all conditions of operation of said rotor.

5. In a disk brake a rotor having opposed parallel flat friction surfaces formed thereon, said rotor comprising a first circular segment bounded by the inner periphery of the rotor and a plurality of spaced apart arcuate slots permitting radial expansion of the first circular segment, a radially segment bounded by the outer periphery and a second series of arcuate spaced apart slots permitting radial expansion of said outer segment, a plurality of sectors of said rotor joining the inner and outer circular segments, a plurality of spaced radial slots connecting the arcuate slots between the ends thereof to enable circumferential expansion of the portion of the rotor between said inner and outer circular segments, a plurality of transverse slots formed in the outermost edge of said outer segment in radial alignment with said plurality of sectors and arranged to engage a plurality of rotor drive keys.

6. In a disk brake, a solid annular rotor construction having concentric inner and outer peripheries and further having opposed parallel flat friction surfaces formed by the two sides thereof, a plurality of spaced apart expansion slot patterns, each of said slot patterns having two concentrically curved arcs which are also concentric with said peripheries, and an intersecting radial slot which is formed transversely to said arcuate slots, said rotor being thereby divided into inner and outer annular segments which can expand radially relative to each other, and an intermediate segment which is divided into portions in a manner permitting circumferential expansion thereof.

7. A brake rotor having an engageable friction surface formed by each side thereof and being operatively connected to a rotating member for braking the same, said rotor comprising a radially inner annular segment bounded by arcuate slots terminating in rounded end portions, a radially outward annular segment also bounded by arcuate slots terminating in rounded end portions, radially extending portions joining said inner and outer annular segments, an intermediate annular segment bounded by said arcuate slots, a plurality of radial slots extending between the arcuate slots and dividing the intermediate annular segments into several portions, said inner, outer and intermediate segments lying in a common plane under all conditions of operation, and slotted connecting means joining said rotating member and said rotor whereby movement of said rotor relative to said rotating member is permitted in an axial direction and resisted in the direction of rotation.

8. A brake rotor as claimed in claim 7 wherein said slotted connecting means is aligned radially with said radially extending portions.

References Cited in the file of this patent
UNITED STATES PATENTS

| | | |
|---|---|---|
| 1,868,543 | Salzman | July 26, 1932 |
| 2,033,835 | Lansing | Mar. 10, 1936 |
| 2,190,767 | Benson | Feb. 20, 1940 |
| 2,453,811 | Pennington | Nov. 16, 1948 |
| 2,525,648 | Butter | Oct. 10, 1950 |
| 2,531,696 | Martin | Nov. 28, 1950 |
| 2,835,355 | Armstrong | May 20, 1958 |

OTHER REFERENCES

Ser. No. 322,595, Maier et al. (A.P.C.) published May 18, 1943.

UNITED STATES PATENT OFFICE
CERTIFICATE OF CORRECTION

Patent No. 2,905,279            September 22, 1959

Edward L. Moyer

It is hereby certified that error appears in the printed specification of the above numbered patent requiring correction and that the said Letters Patent should read as corrected below.

Column 4, line 56, after "brake" insert a comma; line 61, after "radially" insert -- outer --.

Signed and sealed this 13th day of September 1960.

(SEAL)

Attest:

KARL H. AXLINE            ROBERT C. WATSON
Attesting Officer            Commissioner of Patents